3,019,225
SALT OF PIPERAZINE

James R. Anslow, Austin, Tex., assignor to Jefferson Chemical Company, Inc., Houston, Tex., a corporation of Delaware
No Drawing. Filed Sept. 12, 1960, Ser. No. 55,139
5 Claims. (Cl. 260—268)

This invention relates to a piperazine salt and to a method of preparing the same. More particularly, this invention relates to a piperazine salt composition having improved physical properties and to a method for the preparation of the salt.

Piperazine and salts thereof are useful for a variety of purposes (e.g. as anthelmintic agents for the deworming of animals and poultry, as corrosion inhibitors, etc.). When piperazine or a salt thereof is to be used as an anthelmintic agent, the piperazine may be mixed with the feed for the animal or may be added to the drinking water. The provision of a piperazine salt that can be stored and handled with ease, especially in cold climates, and that can be mixed with feed or water or both without difficulty presents many problems. Usually these are primarily due to the low actual piperazine content of the composition or due to the inability of conventionally employed forms of piperazine compositions to be satisfactorily handled under many conditions of use. Past suggestions have left much to be desired.

It has now been discovered, surprisingly, that a salt having improved physical properties and satisfactory anthelmintic properties can be provided through the provision of a salt of piperazine comprising a sulfate ion combined with two mols of piperazine per mol of sulfate ion. The chemical composition of this material has not been fully established. However, the salt of the present invention is believed to be and will be hereinafter referred to as dipiperazine sulfate. The salt (dipiperazine sulfate) is a white hygroscopic crystalline material which is soluble in water, which chars with decomposition above about 300° C. and which can be used to form concentrated aqueous solutions having a pH of about 8 which are characterized by a surprising freeze-thaw stability.

For example, the salt of the present invention will solubilize water to a surprising degree whereby it is possible not only to form dilute aqueous solutions containing about 15 to 30 grams of piperazine per 100 ml., but also to form concentrated dipiperazine sulfate solutions of water containing from about 30 up to about 60 grams of piperazine per 100 ml. of solution. Such concentrated solutions when chilled below 0° C. will form supersaturated dipiperazine sulfate solutions of water from which water will precipitate, if at all, in the form of fine ice crystals which are held in suspension in the solute. If the temperature is further lowered, the solution will eventually gel at temperatures of from about —5° to about —25° C., but the gel will revert to a liquid form on warming. In contrast, other piperazine salts such as mono- or dipiperazine hydrochloride, piperazine monosulfate, piperazine monopropionate, etc. have a much lower solubility in water. As a consequence, concentrated aqueous solutions of the other salts in question will contain smaller amounts of piperazine and the piperazine salt which tend to precipitate on cooling of the solution. Piperazine salts, once precipitated, tend to settle whereby both warming and agitation are required if the precipitated salt is to be redissolved.

The starting materials for the present invention are piperazine, water, and a water soluble sulfate radical donor such as sulfuric acid (dihydroxy sulfate), ammonium acid sulfate, ammonium sulfate, etc. Sulfuric acid, ammonium sulfate, and piperazine normally have minor quantities of impurities, such as iron impurities, amine type impurities, etc., associated therewith which impart objectionable odor or objectionable color or both to aqueous solutions of dipiperazine sulfate unless the impurities are removed.

Dipiperazine sulfate may be prepared, for example, by the addition of one mol of a water soluble slufate to two mols of piperazine in an aqueous solution. Suitable sulfates include sulfuric acid (dihydroxysulfate), sulfonic acid, ammonium acid sulfate and ammonium slufate. Metal sulfates such as barium sulfate, calcium sulfate, etc. are generally unsatisfactory. A preferred sulfate starting material is ammonium sulfate, which gives the best results.

A preferred method of preparation is to provide a concentrated aqueous solution of piperazine to which about 0.5 mol of sulfate per mol of piperazine is added with or without but preferably with agitation. When this is done, salt formation occurs under substantially basic conditions and the only materials which precipitate are impurities which are conveniently removed by filtration. If one mol of water soluble sulfate per mol of piperazine is added to an aqueous solution of piperazine, a precipitate is initially formed in comparative large amounts which is composed not only of impurities but also of piperazine mono-sulfate. Although the addition of an additional mol of piperazine per mol of sulfate with agitation and moderate heating will cause the piperazine mono-sulfate to react with the additional piperazine to give the dipiperazine sulfate of the present invention, the procedure is awkward and time-consuming.

In somewhat greater detail, the dipiperazine sulfate of the present invention may be prepared by adding a sulfate radical donor, as above described, to a concentrated aqueous solution of piperazine (containing, for example, from about 40 to 60 wt. percent of piperazine). The addition is preferably accomplished with agitation at temperatures within the range of about 20° to 100° C. Not more than about 0.5 mol of sulfate radical should be provided for each mol of piperazine. Although lesser amounts may be employed, this is not entirely advantageous because of an increase in the pH of the solution that is associated with the use of the lesser amounts of sulfate radical donor.

During the addition of the sulfate radical donor gas may be evolved, such as ammonia when the sulfate radical donor is ammonium sulfate.

After the addition of the sulfate radical donor is complete, it will normally be desirable to remove impurities from solution. This is conveniently accomplished by adding about 1–10 wt. percent of a solid decolorant such as charcoal, etc. and, optionally, a filter aid such as diatomaceous earth, etc. followed by filtration of the resultant mixture under ambient conditions.

When ammonium sulfate or ammonium acid sulfate is employed, it is frequently desirable to use an amount of water above and beyond that which is desired in the final product and to then distill off the excess water. When this is done, the solution will be effectively stripped of ammonia.

The aqueous product of the present invention may contain dipiperazine sulfate in an amount sufficient to provide 47 wt. percent piperazine (calculated as piperazine, as such, not as piperazine sulfate) while retaining all of the dipiperazine sulfate in solution. However, more dilute solutions may be prepared if desired, since the dipiperazine sulfate is completely miscible with water.

The invention will be further illustrated by the following specific examples which are given by way of illustration and not as limitations on the scope of this invention:

EXAMPLE 1

A 60% by weight piperazine solution was made by mixing 600 grams of flaked piperazine with 400 ml. of tap water. The solution was heated to 65° C. on a hot plate in order to dissolve all of the piperazine. The mixture was transferred to a 3,000 ml. three-necked reaction flask equipped with an electrically driven stirrer and a thermometer. The flask was vented through the agitator inlet neck. 356 grams of 96% C.P. grade sulfuric acid were slowly added to the reaction flask through a graduated dropping funnel with agitation. The total acid: piperazine mole ratio was purposely held at approximately 1:2. The maximum temperature of the reaction was held to 63.5° C. by regulating the rate of acid addition and circulating tap water around the reaction flask. There is no apparent effect on the product even when the reaction temperature exceeds 100° C. The product can be cooled to −1° C. with no precipitate forming. The pH of a 20% aqueous solution of the product was 7.95. The piperazine content by weight analyzed 43.85%, water content by weight was 33.3% and density at 35° C. was 1.253 grams/milliliter. The piperazine content, expressed another way, was 54.9 grams/100 ml. of solution. Mixing carbon black with the product and filtering through filter paper produced a water-white filtrate. The viscosity of the product is about 100.7 centipoises at 100° F. The solution was substantially odorless.

EXAMPLE 2

Additional dipiperazine sulfate solutions were prepared from sulfuric acid and piperazine ultizing the method described above in Example 1. The solutions prepared and the results obtained are set forth in Table I:

*Table I*

BATCH RUNS—SULFURIC ACID METHOD

| Run No | 2205-7 | 2205-18 |
|---|---|---|
| Charge | | |
| Piperazine added (98%), grams | 600 | 600 |
| Piperazine added, mols | 6.826 | 6.826 |
| Volume water added, ml | 400 | 400 |
| C.P. 96% sulfuric acid added, gms | 356 | 356 |
| 100% sulfuric acid added, mols | 3.483 | 3.483 |
| Reaction Details | | |
| Temperature of piperazine-water solution, ° C | 65 | 65 |
| Time required for sulfuric acid add'n, min | 28 | 77 |
| Temperature at start of reaction, ° C | 59.5 | 45 |
| Maximum reaction temperature, ° C | 63.5 | 80 |
| Agitation | Moderate | Moderate |
| Properties of Liquid Product | | |
| pH of 1 part solution: 5 parts water | 7.9 | 8.1 |
| Piperazine, weight percent | 43.84 | 44.4 |
| Piperazine, gms./100 ml. solution at 20° C | 55.4 | 56.1 |
| Water, weight percent | 33.3 | 30.7 |
| Pt-Co color, 25% aqueous solution [1] | 25 | 20 |
| Density grams/ml. at 20° C | 1.2631 | 1.2646 |
| Viscosity at 100° F., centistokes | 66.8 | 80.3 |

[1] American Public Health Association platinum-cobalt color test value

EXAMPLE 3

In a modified procedure, 600 grams of flaked piperazine were dissolved in 400 ml. of tap water at 56° C. and the solution was then transferred to a three-necked reaction flask. 712 grams (6.956 mols) of 96% sulfuric acid was slowly added with agitation. Mono-piperazine sulfate precipitated after about half of the sulfuric acid had been added. The reaction mass gelled after about three-fourths of the acid had been added. An additional 600 grams (6.826 mols) of flaked piperazine was slowly added to the reaction mixture, whereupon the gel commenced to dissolve to provide a solution. The solution started to gel again after about one-half of the additional piperazine had been added. Thereupon an additional 400 ml. of water was added to the mixture and then temperature was raised to 65° C. with agitation. After about one hour, all of the precipitate had dissolved to provide a single-phase solution. One part of the thus prepared solution was added to five parts of water to provide a dilute solution which was found to have a pH of 8.05 and an American Public Health Association color test valuation (platinum-cobalt color) of between 75 and 100. The solution, itself, was found to contain about 44.16% piperazine and about 31.95% water. The results of this experiment are summarized in Table II:

*Table II*

VARIABLE METHOD OF ADDITION OF REACTANTS—SULFURIC AND METHOD

| Run No | 2205-8 |
|---|---|
| Charge | |
| Piperazine added initially, grams | 600 |
| Piperazine added initially, mols | 6.826 |
| Volume water added initially, ml | 400 |
| C.P. 96% sulfuric acid added, grams | 712 |
| 100% sulfuric acid added, mols | 6.965 |
| Additional piperazine added, grams | 600 |
| Additional piperazine added, mols | 6.826 |
| Additional water added, ml | 400 |
| Reaction Details | |
| Temperature of initial piperazine water solution, ° C | 56 |
| Time required for sulfuric acid add'n, min | 26 |
| Temperature at start of reaction, ° C | 41 |
| Maximum reaction temperature, ° C | 88 |
| Temperature at start of adding add'n piperazine, ° C | 53 |
| Temperature at end of adding add'n piperazine, ° C | 54 |
| Agitation | Moderate |
| Properties of Liquid Product | |
| pH of 20% aqueous solution | 8.05 |
| Piperazine, weight percent | 44.16 |
| Water, weight percent | 31.95 |
| Pt-Co color of 25% aqueous solution | >75<100 |

EXAMPLE 4

A series of runs were made following the procedure of Example 1 and using a slight excess of sulfuric acid. In each case there was only a moderate change in the pH of the final solution which was accompanied by an undesirable precipitation of mono-piperazine sulfate.

The results of this series of runs are set forth in Table III:

*Table III*

ADDITION OF EXCESS SULFURIC ACID

| Run No | 2205-13 | 2205-14 | 2205-16 | 2205-19 | 2205-15 |
|---|---|---|---|---|---|
| Change | | | | | |
| Piperazine added, gms | 600 | 600 | 600 | 550 | 650 |
| Piperazine added, mols | 6.826 | 6.826 | 6.826 | 6.250 | 7.395 |
| Volume water added, ml | 400 | 400 | 400 | 450 | 350 |
| C.P. 96% H₂SO₄ added, gms | 363 | 370 | 377 | 335 | 386 |
| 100% H₂SO₄ added, mols | 3.553 | 3.622 | 3.691 | 3.279 | 3.773 |
| Percent H₂SO₄ as weight percent of total acid (100%) necessary for 2:1 piperazine-H₂SO₄ ratio | 3.9 | 5.8 | 7.6 | 4.7 | |
| Percent excess H₂SO₄ as weight percent of total charge | 1.0 | 1.5 | 2.0 | 1.2 | |

Table III—Continued

| Run No. | 2205-13 | 2205-14 | 2205-16 | 2205-19 | 2205-15 |
|---|---|---|---|---|---|
| REACTION DETAILS | | | | | |
| Temperature of initial piperazine-water solution, °C | 67 | 73 | 87 | 61 | 95 |
| Time required for H₂SO₄ add'n, min | 32 | 15 | 22 | 10 | 16 |
| Temperature at start of reaction, °C | 61 | 59 | 60 | 48 | 82 |
| Maximum reaction temperature, °C | 61 | 88 | 67 | 80 | 107 |
| Agitation | Moderate | Moderate | Moderate | Moderate | Moderate |
| PROPERTIES OF PRODUCT | | | | | |
| Precipitate recovered, gms | 12 | 33.6 | 79.2 | 0 | |
| Precipitate recovered, percent of initial charge | 0.9 | 2.45 | 5.75 | | |
| Piperazine content of filtrate, weight percent | 43.75 | 43.9 | 42.9 | 41.09 | |
| Water content of filtrate, weight percent | 31.7 | 29.4 | 32.3 | 35.1 | |
| Pt-Co color of 25% aqueous solution | (>75<100) | 55 | 55 | (>50<75) | |
| Specific gravity 20/20° C | | | | 1.2509 | |
| pH of 1 part product: 5 parts sample | 7.95 | 7.85 | 7.7 | 7.9 | |
| Piperazine concentration of filtrate, grams piperazine/100 ml. solution at 20° C | | | | 51.4 | |
| PROPERTIES OF LIQUID PRODUCT | | | | | |
| pH of 20% aqueous solution | | | | | 8.2 |
| Filtrate recovered, grams | | | | | 1,272 |
| Piperazine, weight percent | | | | | 45.9 |
| Water, weight percent | | | | | 25.3 |
| Pt-Co color of 25% aqueous solution | | | | | 60 |
| PRECIPITATE | | | | | |
| Precipitate formed, grams | | | | | 69 |
| Precipitate formed, percent of initial charge | | | | | 5.0 |
| Precipitate formed, percent of total product recovered | | | | | 5.1 |

EXAMPLE 5

An alternate method of producing the same product was performed by dissolving 600 grams of piperazine in 753 ml. of city tap water (44.35% piperazine by weight). The solution was heated to 46° C. on hot plate in order to dissolve all of the piperazine. The mixture was then transferred to a 3,000 ml., three-necked reaction flask containing stainless steel turnings. (The turnings were to check on effect of stainless steel on reaction product color only.) 460 grams of ammonium sulfate was added rapidly to the flask. The flask was then transferred to a packed glass still and a heating jacket was placed around it. The still was vented to the atmosphere after the overhead cooler. Water was turned off the overhead condenser directly above the still while water was allowed to flow through the overhead cooler located to the side of the still. Heat was applied to the heating jacket by means of a variable Powerstat unit. The theoretical amount of water (265 ml.) required to give a piperazine concentration of 51 grams/100 ml. of solution was boiled off, condensed in the overhead cooler and collected in a graduate. The ferric hydroxide (Fe(OH)₃) which precipitated out during the aqueous ammonia boiling operation and the amine color were removed by adding 14 grams (approximately 1% by weight remaining in the flask) of powdered carbon black and 14 grams of diatomaceous earth filter aid to the flask. The mixture was allowed to cool down to approximately 85° C. and was then filtered through filter paper twice. The product had a platinum-cobalt color of 25 (nearly water-white). The density of the product at 35° C. was 1.246 grams/milliliter. The pH of 1 part solution : 5 parts distilled water was 8.2. The piperazine content by weight was 42.6%; water content by weight was 33.9%. The specific gravity at 20/20° C. was 1.2555. Expressed another way, the piperazine content was 53.6 grams/100 ml. of solution at 20° C. The sample temperature was lowered to −2° C. and allowed to heat up slowly to room temperature. No precipitate formed during this operation.

EXAMPLE 6

Although excess ammonia may be tied up with the addition of sulfuric acid, the remaining traces of ammonia are most effectively removed by stripping excess water from the reaction mixture.

The removal of precipitated ferric hydroxide, ammonia and excess water; carbon treatment; and, filtration steps can be combined in several different ways. The removal of ammonia and excess water in one step, the addition of carbon and a filter aid and then filtration has been found to be the most effective procedure for the manufacture of nearly water-white, minimum ammonia content product.

In run 2214-2, a 43.5% by weight piperazine solution was reacted with ammonium sulfate in the ratio of 2 mols of piperazine : 1 mol of ammonium sulfate. The mixture was boiled for 35 minutes at atmospheric pressure and was then filtered to remove precipitated ferric hydroxide. The filtrate was again boiled for 70 minutes under vacuum. Enough water was then boiled overhead to bring the piperazine concentration to greater than 42% by weight. The resultant product contained 44.3% piperazine by weight, had a Pt-Co color between 125 and 150 and had a specific gravity at 20/20° C. of 1.2685. Piperazine concentration expressed another way was 56 grams/100 ml. of solution, pH of 1 part product; 5 parts distilled water was 8.0.

In run 2214-3, the same reactant ratios were used as in run 2214-2. The reaction mixture was boiled for 45 minutes at atmospheric pressure and was then weighed to confirm that the theoretical amount of ammonia had been driven off. Powdered carbon black equivalent to 1% by weight of the remaining reaction mixture was then added and the product filtered. The filtrate was water-white. The filtrate was then boiled for 55 minutes under vacuum, boiling sufficient water overhead to give a piperazine concentration greater than 42% by weight. The product contained 43.3% piperazine by weight, had a Pt-Co color of 50 and a specific gravity at 20/20° C. of 1.2608. Piperazine concentration expressed another way was 54.6 grams/100 ml. of solution at 20° C. pH of 1 part product : 5 parts distilled water was 8.05.

In run 2214-4, the reactact ratios used in run 2214-2 were again used. The reaction mixture was boiled for 100 minutes at atmospheric pressure with sufficient water taken overhead to give a piperazine concentration greater than 42% by weight. Carbon black equivalent to 1% by weight of the reaction mixture and an equal amount of filter aid were added. The product was then filtered. After running the filtrate back through the filter once again, the product obtained was colorless. Product analysis was 42.6% piperazine by weight, a Pt-Co color of 25, 33.9% water by weight, a specific gravity at 20/20° C. of 1.2555 and a pH of 1 part product : 5 parts distilled water of 8.2. Piperazine concentration expressed a different way was 53.6 grams/100 ml. of solution. Percent ammonia in the product as analyzed by the Van Slyke method for primary amines was found to be 0.1% by weight.

No apparent color pickup was experienced during any of the preceding runs due to the presence of stainless steel turnings in the reaction flask.

Data concerning these runs are given in Table IV:

Table IV
VARIOUS METHODS OF AMMONIA AND COLOR REMOVAL

| Run No. | 2214-2 | 2214-3 | 2214-4 |
|---|---|---|---|
| CHARGE | | | |
| Piperazine added, gms | 600 | 600 | 600 |
| Piperazine added (100%), mols | 6.826 | 6.826 | 6.826 |
| Volume water added, ml | 753 | 753 | 753 |
| Water added, mols | 41.833 | 41.833 | 41.833 |
| Ammonium sulfate added, gms | 460 | 460 | 460 |
| Ammonium sulfate added (100%), mols | 3.446 | 3.446 | 3.446 |
| REACTION DETAILS | | | |
| Time boiled at atmos. press., min | 35 | 45 | 100 |
| Maximum temp. attained while boiling at atmos. press., °C | 105 | 103 | 116 |
| Time boiled under vacuum, min | 70 | 55 | 0 |
| Minimum temp. attained while boiling under vacuum, °C | 44 | 59 | |
| Maximum vacuum, mm. Hg | 38 | 82 | |
| Total weight lost during boiling, grams | 507 | 396 | 387 |
| Carbon treated | No | Yes | Yes |
| PROPERTIES OF PRODUCT | | | |
| pH of 1 part solution: 5 parts distilled water | 8.0 | 8.05 | 8.2 |
| Piperazine, weight percent | 44.3 | 43.3 | 42.6 |
| Water, weight percent | | | 33.9 |
| Specific gravity, 20/20° C | 1.2685 | 1.2608 | 1.2555 |
| Platinum-cobalt color | 125-150 | 50 | 25 |
| Piperazine concentration, grams/100 ml. solution at 20° C | 56 | 54.6 | 53.6 |
| Ammonia, weight percent | | | 0.1 |

From the results set forth in Table IV it will be observed that the most effective method for the preparation of the concentrated solution of dipiperazine sulfate was the addition of 0.5 mol of ammonium sulfate per mol of piperazine to a dilute aqueous solution of piperazine, which is accompanied by the evolution of ammonia, with distillation to remove excess water and substantially all of the ammonia, followed by the addition of a solid decolorant (e.g. charcoal) and a filter aid and subsequent filtration whereby there is provided a substantially water-white ammonia free solution containing in excess of 50 grams of piperazine per 100 ml. of solution.

As adduced by the foregoing examples, the present invention may be characterized as dipiperazine sulfate, aqueous solutions thereof and a method which comprises the steps of sulfating piperazine with an amount of a water soluble sulfate donor sufficient to provide not less than about 2 mols of piperazine per mol of sulfate and from more than about 2.5 to about 30 mols of water per mol of dissolved piperazine.

A preferred embodiment of the present invention comprises an aqueous solution containing not less than about 2 mols of dissolved piperazine per mol of water soluble sulfate donor and from more than about 2.5 to about 10 mols of water per mol of dissolved piperazine. Aqueous solutions of this nature have surprising and unusual properties including a pH of not more than about 8 and low temperature freeze-thaw stability. Thus, when such a solution is cooled below 0° C., the precipitate that forms is a non-dipiperazine sulfate crystalline material and the dipiperazine sulfate remains in solution. As another example, a solution containing about 2 mols of dissolved piperazine per mol of sulfate radical and from more than about 2.5 to about 5 mols of water per mol of dissolved piperazine will form either a highly viscous liquid suspension of non-dipiperazine sulfate crystals or a gel when cooled below about 0° C. (e.g. to —5° C. or lower); either of which will freely revert to a single phase liquid on warming to room temperature.

The concentrated dipiperazine sulfate solutions of the present invention, which will normally have a pH of about 8, are to be contrasted with an aqueous solution of mono-piperazine sulfate which will have a pH of about 2 and which has only a limited piperazine content.

In this regard the use of less than about 0.5 mol of sulfate per mol of piperazine will not cause precipitation, but will increase the pH of the solution, whereas the use of more than about 0.5 mol of sulfate per mol of piperazine will result in the precipitation of mono-piperazine sulfate.

Having described my invention, what is claimed is:

1. Dipiperazine sulfate.
2. An aqueous solution of dipiperazine sulfate containing not less than about 2 mols of dissolved piperazine per mol of sulfate radical and from more than about 2.5 to 30 mols of water per mol of dissolved piperazine.
3. An aqueous solution of dipiperazine sulfate containing not less than about 2 mols of dissolved piperazine per mol of sulfate radical and from more than about 2.5 to about 5 mols of water per mol of dissolved piperazine.
4. A method which comprises the addition to an aqueous solution of piperazine containing more than about 2.5 moles of water per mole of piperazine of not more than about 0.5 mole of a soluble sulfate radical donor per mole of piperazine to thereby provide a stable solution.
5. A method which comprises the steps of preparing an aqueous solution of piperazine containing about 3 to 12 mols of water per mol of piperazine, adding not more than about 0.5 mol of ammonium sulfate per mol of piperazine with agitation at a temperature within the range of about 30° to 100° C., to thereby provide a crude solution of water in dipiperazine sulfate, whereby ammonia is liberated during said addition, stripping from about 0.3 to 5 mols of water per mol of piperazine from said dipiperazine sulfate solution to thereby remove substantially all of the dissolved ammonia, adding from about 0.5 to 10 wt. percent, based on the remaining solution, of a solid decolorizing agent and filtering the resultant mixture to thereby obtain a substantially colorless solution of water in dipiperazine sulfate.

References Cited in the file of this patent

UNITED STATES PATENTS

| 2,753,350 | Hasselstrom | July 3, 1956 |
| 2,919,275 | Bond | Dec. 29, 1959 |